(12) United States Patent
Stewart

(10) Patent No.: US 6,250,158 B1
(45) Date of Patent: *Jun. 26, 2001

(54) MONOLITHIC VIBRATING BEAM ANGULAR VELOCITY SENSOR

(75) Inventor: Robert E. Stewart, Woodland Hills, CA (US)

(73) Assignee: Litton Systems, Inc., Woodland Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/854,240

(22) Filed: May 9, 1997

(51) Int. Cl.$^7$ ........................................... G01P 9/04
(52) U.S. Cl. ........................... 73/504.14; 73/504.12
(58) Field of Search ..................... 73/504.14, 504.12, 73/504.15, 504.16; 310/329

(56) References Cited

U.S. PATENT DOCUMENTS

| | | | |
|---|---|---|---|
| 3,520,195 | 7/1970 | Tehon | 73/504.14 |
| 4,836,023 | * 6/1989 | Oikawa | 73/504.14 |
| 5,056,366 | 10/1991 | Fersht et al. | 73/504.15 |
| 5,505,084 | * 4/1996 | Greiff et al. | 73/504.14 |
| 5,675,083 | * 10/1997 | Nakamura | 73/504.14 |

FOREIGN PATENT DOCUMENTS

| | | |
|---|---|---|
| 61-114123 | 5/1986 | (JP) . |
| 5333038 | 12/1993 | (JP) . |
| 07131280 | 5/1995 | (JP) . |
| 08233582 | 9/1996 | (JP) . |

OTHER PUBLICATIONS

William D. Gates, "Vibrating Angular Rate Sensor May Threaten the Gyroscope", *Electronics*, pp. 130–134 (Jun. 10, 1968).

Brian Dance, "Piezoelectric Ceramic Elements for Compact Gyroscope", *Design News*, pp. 113, 114 (Sep. 20, 1993).

D. L. Polla, "Integrated Ferroelectric Micromechanical Systems", *Science and Technology of Electroceramic Thin Films*, pp. 413–426 (1995).

P. Schiller et al., "Integrated Piezoelectric Microactuators Based on PZT Thin Films", *Seventh International Conference on Solid–State Sensors and Actuators*, pp. 154–157.

P. Muralt et al., "Fabrication and Characterization of PZT Thin Films For Micrometers", *Proceedings of The Eight International Conference on Solid–State Sensors and Actuators and Eurosensors IX*, pp. 397–400 (Jun. 25–29, 1995).

* cited by examiner

Primary Examiner—John E. Chapman
(74) Attorney, Agent, or Firm—Elliott N. Kramsky

(57) ABSTRACT

A monolithic angular velocity sensor is formed from a common planar silicon substrate. Sensor element(s) comprising elongated beams is/are suspended within framed apertures formed within the common substrate. Transverse members, or ears, secure the elongated beam(s) to the frame and to the nodal points of the beam(s). Both single beam and multiple beam array sensors may be formed within a common silicon substrate. Orthogonally-directed beams, or arrays of beams, formed with a common substrate, permit angular velocity measurements about two orthogonal axes.

12 Claims, 4 Drawing Sheets

Figure 1:
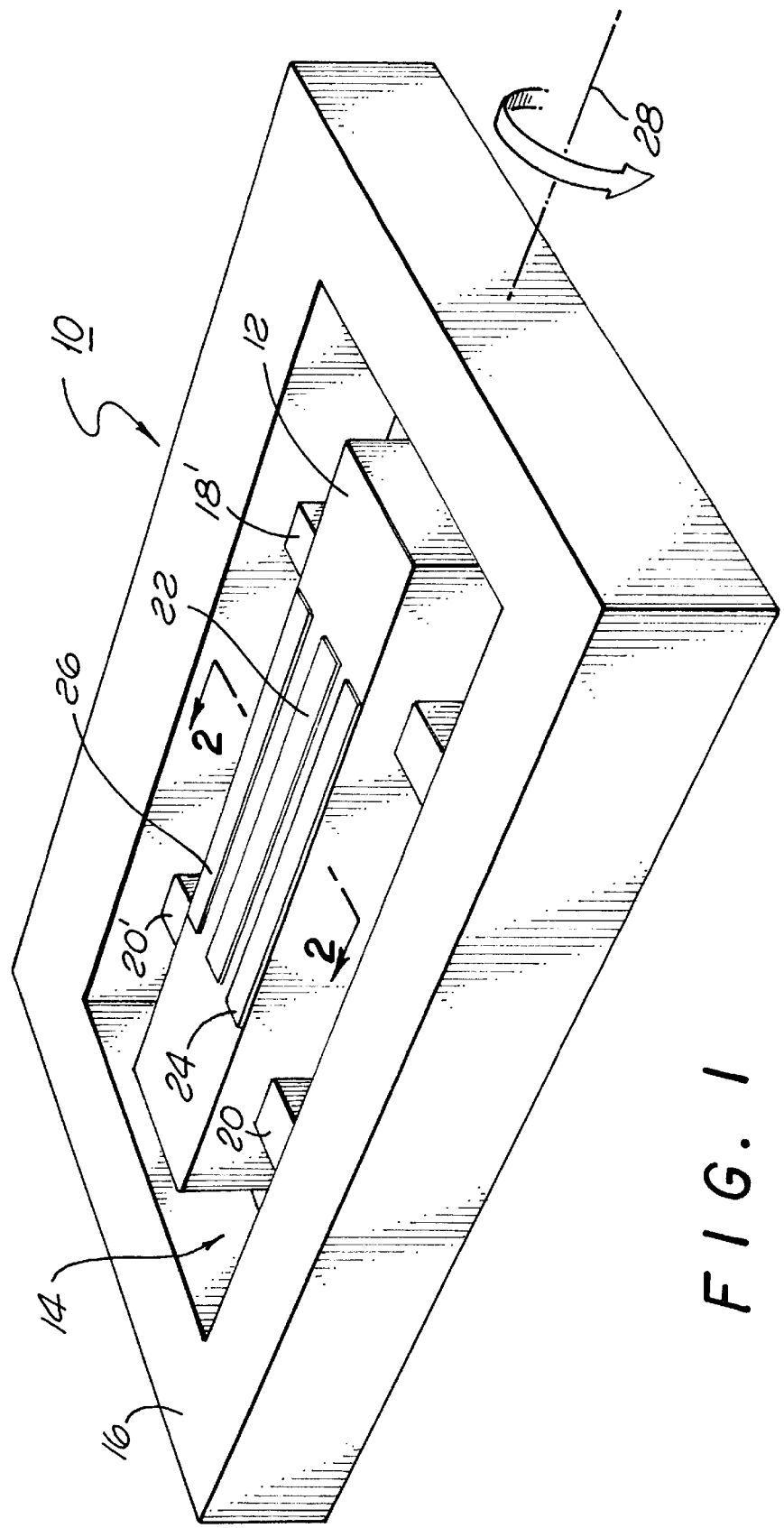

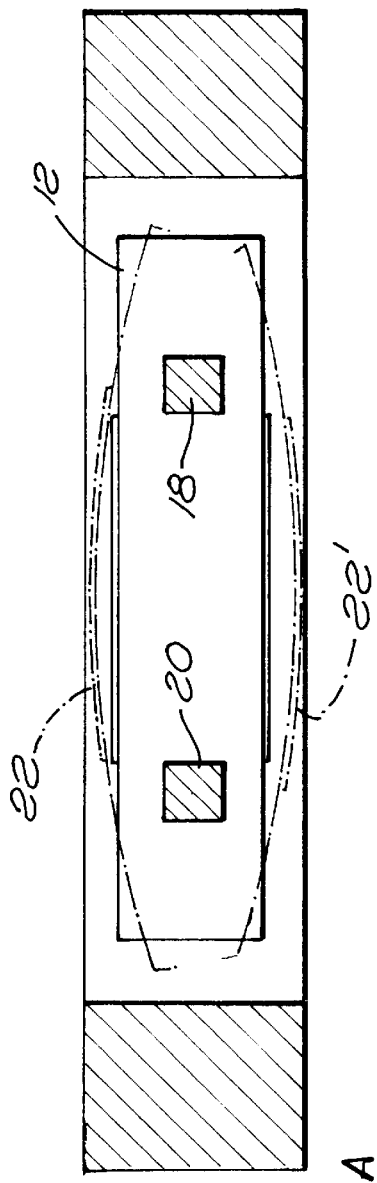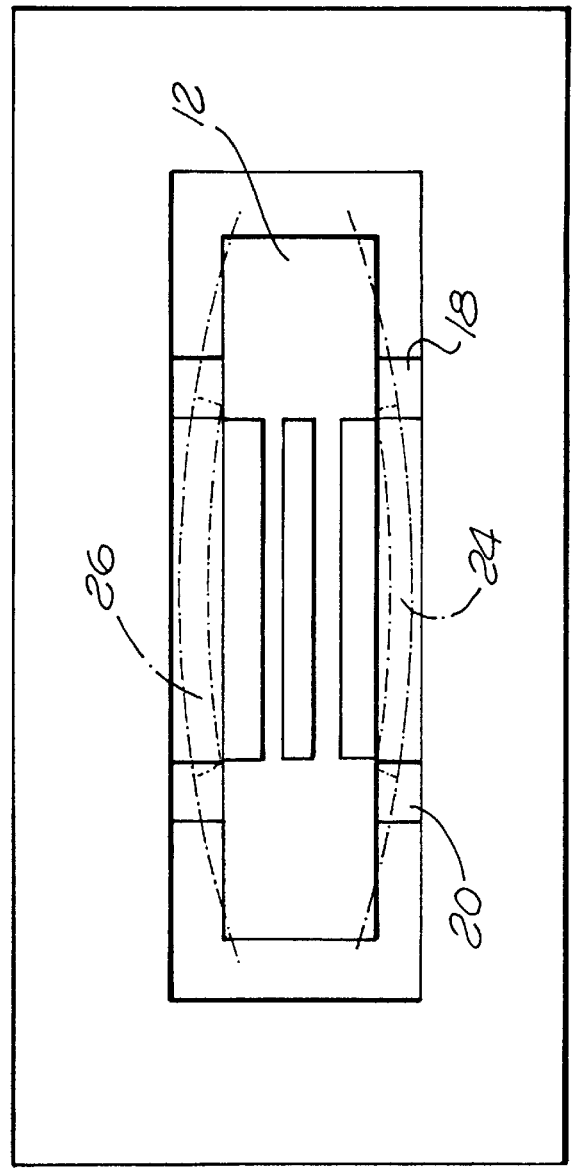
FIG. 3A
FIG. 3B

MONOLITHIC VIBRATING BEAM ANGULAR VELOCITY SENSOR

BACKGROUND

1. Field of the Invention

The present invention relates to angular velocity sensors. More particularly, this invention pertains to a batch processed silicon beam array angular velocity sensor based upon the Coriolis sensing method.

2. Description of the Prior Art

Numerous arrangements exist for measuring rotation rate about a preselected axis in inertial space. Such apparatus, commonly designated a gyroscope, forms an essential element of any inertial navigation system. Gyroscopes include, for example, complex and difficult-to-manufacture gimballed spinning rotors, strapdown sensors such the ring laser and fiber optic gyroscopes. All of the above-named rate sensing devices are characterized by high cost, large size and power consumption, complexity of manufacture, expense of maintenance.

Other systems exist for measuring an input rotation rate about a preselected axis which are based upon the principle of the Focoult pendulum that was developed over one hundred years ago. A rate sensor based upon that principle, marketed under the trademark "GYROTRON", was developed by the Sperry Gyroscope Corporation. The device, which, as all gyroscopes of the balanced resonant sensor or tuning fork type, provides significantly greater mechanical and operational simplicity than the above-mentioned types, operates on the principle that, when a tuning fork is rotated about its central axis, it possesses an angular momentum that is equal to the product of the rotation rate and the rotational moment of inertia. The reference motion of the tines of the tuning fork changes the moment of inertia cyclically. As a result, the rotation rate must change cyclically in a complementary fashion to conserve the angular momentum. Thus, the physical operation of the tuning fork type sensor is similar to that of a spinning ice skater who spins faster by pulling his arms in and slows down by extending them. Consequently, in a tuning fork sensor the outward-and inward radial vibration of the tines is converted into a rotational vibration whose amplitude is proportional to the input rate. A closed loop vibrating rotation rate sensor is disclosed in U.S. Pat. No. 5,056,366 of Samuel N. Fersht et al. entitled "Piezoelectric Vibratory Rate Sensor."

Many useful applications exist for angular velocity sensors that do not require gyroscopic accuracy. Such applications are found in flight control systems, automobile skid control systems, video camera stabilization and virtual reality systems.

A type of angular velocity sensing device of lesser complexity whose operation also is based upon the measurement of Coriolis forces is disclosed in U.S. Pat. No. 3,520,195 of Stephen W. Tehon titled "Solid State Angular Velocity Sensing Device" and discussed by William D. Gates in an article titled "Vibrating Angular Rate Sensor May Threaten the Gyroscope", *Electronics,* pp. 130–134 (Jun. 10, 1968). This device comprises a square metallic rod that is suspended at its nodal supports from a metal frame. The rod is driven at its fundamental frequency by a piezoelectric drive electrode fixed to one surface while a piezoelectric transducer that serves as a output signal pickoff is fixed to an orthogonal surface. While simple in design and concept, this device is not suitable for batch processing. Further, the piezoelectric elements that serve, inter alia, as drive and pickoff electrodes are bonded to the metallic surfaces of the vibrating rod by organic adhesive. Such adhesive materials absorb energy, causing a reduction in the Q of the vibrating rod. As a consequence, more energy must be input into the rod for the purpose of overcoming damping forces that work against vibration driving forces.

A variation of the VYRO is disclosed in an article by Brian Dance, "Piezoelectric Ceramic Elements for Compact Gyroscope", *Design News,* pgs. 113, 114 (Sep. 20, 1993). The device described comprises an angular velocity sensor of Murata Ltd. of the United Kingdom whose sensing element is formed of "ELINVAR", a nickel-chromium steel alloy. The bar may be of either circular or equilateral triangle cross section. A number of piezoelectric elements are fixed to the sensing element. Again, this device is not suitable for batch processing and is subject to performance degradation due to the presence of organic material for bonding the piezoelectric transducer elements to the vibrating sensor.

SUMMARY OF THE INVENTION

The preceding and other shortcomings of the prior art are addressed by the present invention which provides, in a first aspect, an angular velocity sensor. Such sensor includes an elongated beam. A frame has an internal aperture for accommodating the beam. Means are provided for suspending the beam within the aperture. Means, fixed to the beam, is provided for flexibly driving the beam as well as for detecting the presence and amplitude of magnitude of Coriolis force exerted thereupon. The beam, the means for suspending and the frame are an integral structure comprising silicon.

In a second aspect, the present invention comprises a monolithic angular velocity sensor. Such sensor including a plurality of sensor elements formed within a substantially planar silicon substrate. Each sensor element includes an elongated beam. The major axes of the elongated beam of the sensor elements are aligned parallel to one another.

In a third aspect, the present invention provides a monolithic angular velocity sensor for sensing rotation rates about two orthogonal axes. The sensor includes a first sensor element and a second sensor element formed within a silicon substrate. Each of such sensor elements includes an elongated beam. The major axes of the elongated beams of said sensor elements are aligned orthogonal to one another.

In a fourth aspect, the present invention provides a monolithic angular velocity sensor array for sensing rotation about two orthogonal axes. A first array of sensor elements includes a first plurality of elongated beams aligned parallel to one another. A second array comprises a second plurality of elongated beams aligned parallel to one another. The axes of the beams of the first array are aligned orthogonal to those of the second array. Each array is integral with a silicon substrate.

The foregoing and other features and advantages of this invention will become further apparent from the detailed description that follows. This written description will be accompanied by a set of drawing figures. Numerals of the drawing figures, corresponding to those of the written description, point to the various features of the invention. Like numerals point to like features of the invention throughout both the written description and the drawing figures.

BRIEF DESCRIPTION OF THE DRAWING FIGURES

Figure 2A:
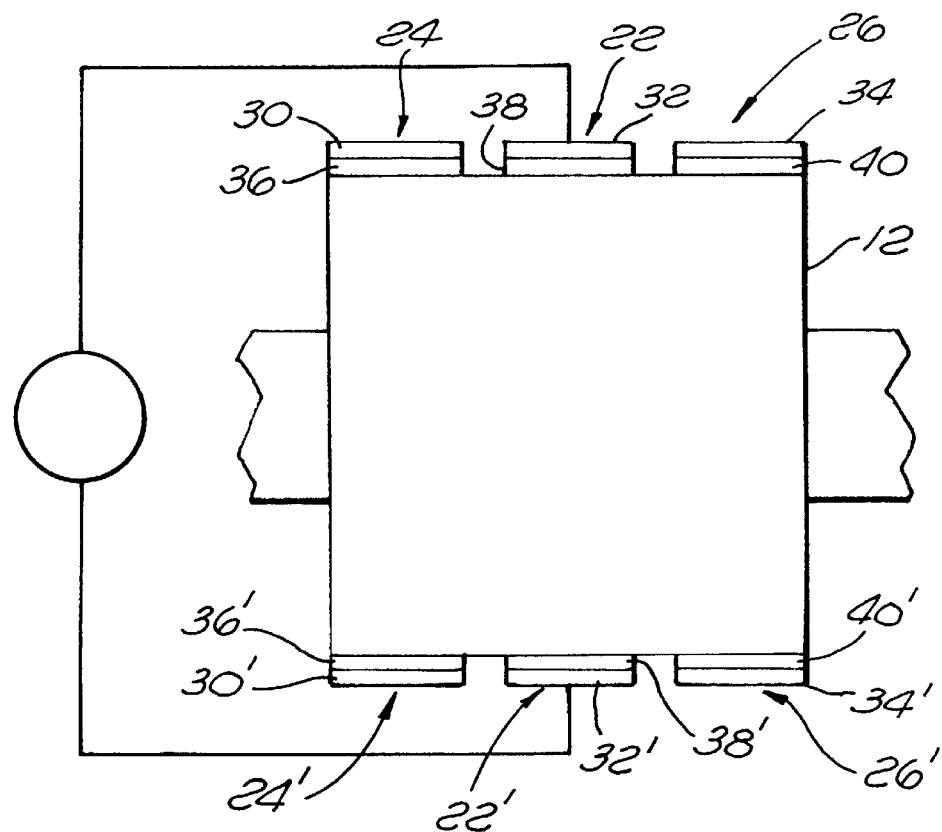
Figure 2B:
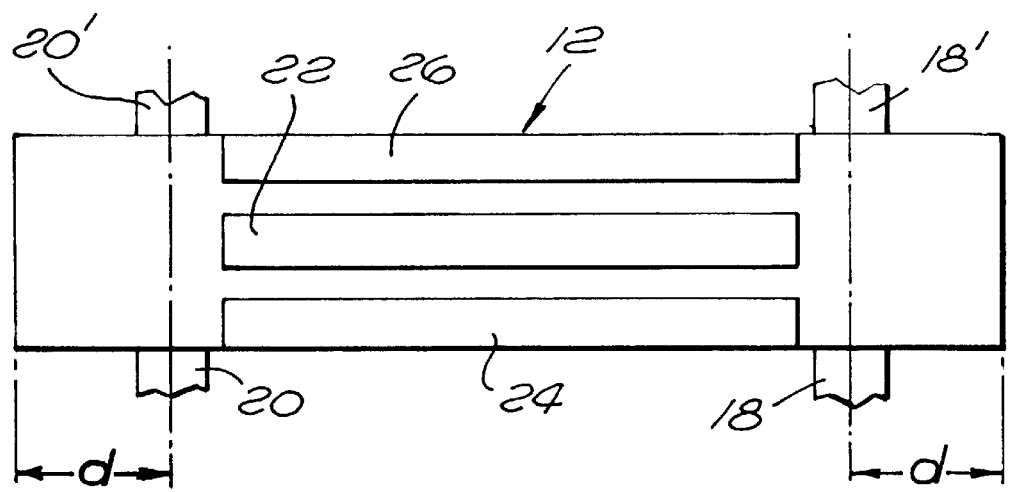
Figure 4:
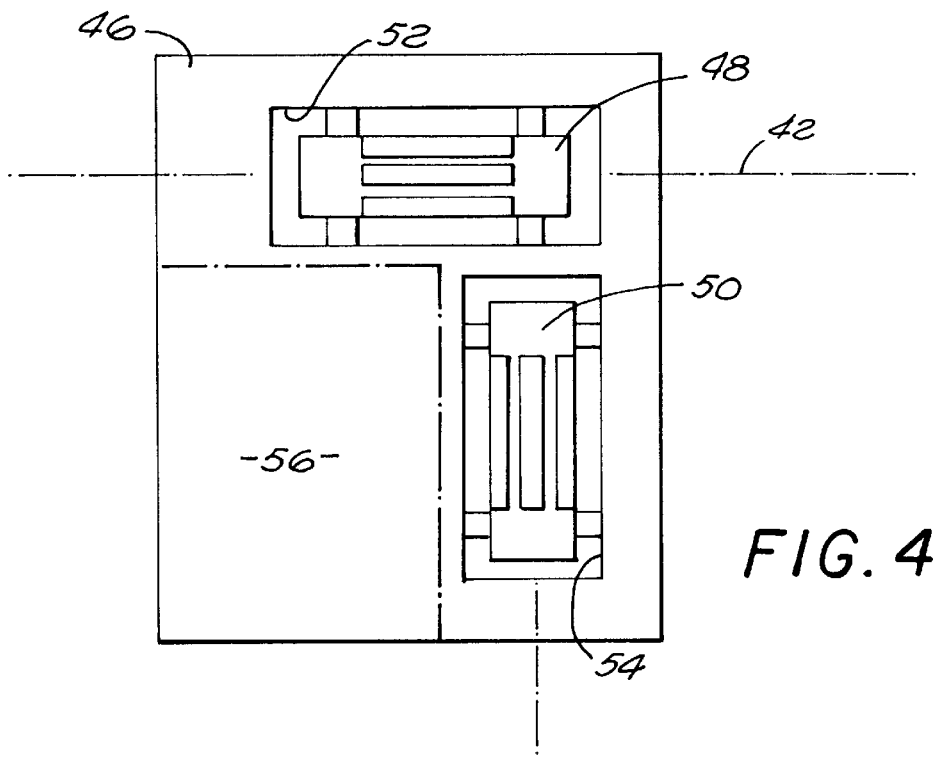
Figure 5:
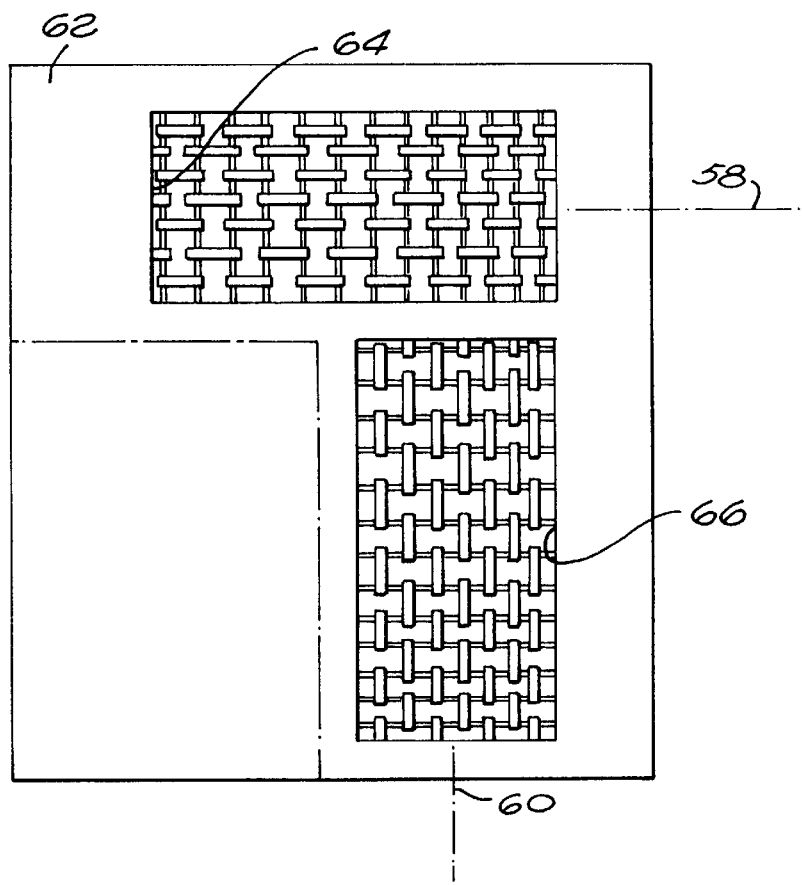

FIG. 1 is a perspective view of a vibratory angular velocity sensor in accordance with the invention;

FIGS. 2(a) and 2(b) are a cross-sectional view taken at line 2(a)—2(a) and a top planar view of the beam of FIG. 1 respectively;

FIGS. 3(a) and 3(b) are side elevation and top planar views of the sensor of FIG. 1 respectively for illustrating the vibrating response of the elongated beam to a driving signal input and to rotation-induced Coriolis force;

FIG. 4 is a top planar view of a monolithic angular velocity sensor in accordance with the invention for sensing angular rotation about orthogonal axes; and FIG. 5 is a top planar view of a monolithic angular velocity sensor comprising orthogonal arrays of vibrating beam sensors for sensing rotations about orthogonal axes.

DETAILED DESCRIPTION OF THE PREFERRED EMBODIMENT

Turning now to the drawings, the invention comprises a silicon-based device of the microelectromechanical system (MEMS) type. As such, it is inherently suitable for integration with on-chip electronics. In the various embodiments as described below, devices in accordance with the invention may be formed by means of known bulk and surface micromachining process technology.

Referring to FIG. 1, an angular velocity sensor 10 in accordance with the invention comprises a monolithic structure micromachined from a wafer of silicon. Such wafers are conventionally prepared with disk-like surfaces of about six to eight inches or more in diameter. By employing known micromachining techniques, more than 100 angular velocity sensors in accordance with the invention can be formed from a single such wafer. This contrasts significantly with the sizes and yields of angular velocity sensors and manufacturing processes therefor in accordance with the prior art that do not take advantage of the manufacturing efficiencies offered by silicon fabrication technology.

The sensor 10 comprises an elongated beam 12 that is suspended within an internal aperture 14 of a frame 16. Transverse members, aligned in pairs, 18, 18', 20, 20' fixed to the sides of the aperture 14 and the bar 12 support the beam 12 therein. Elongated electrodes are fixed to the upper and lower surfaces of the beam 12. Identical arrangements of electrodes are fixed to the top and bottom surfaces of the elongated beam 12, each comprising a central electrode 22, 22' and, spaced therefrom, symmetrically arranged edge electrodes 24, 24' and 26, 26'. The central electrodes 22, 22' are provided for receiving electrical signals which act, in conjunction with underlying piezoelectric elements (discussed below), to drive or vibrate the elongated beam 12 at its natural frequency while the edge electrodes 24, 24' and 26, 26' serve as pickoffs for receiving electrical charge generated within underlying piezoelectric elements that results from Coriolis-force induced bending or vibration in the transverse plane. Such Coriolis force is occasioned by, and proportional to the existence of an angular rate θ about the sensitive or input axis 28 of the sensor 10. As illustrated, the input axis of the angular velocity sensor 10 is aligned with the major or longitudal axis of the beam 12. The arrangement of electrical conductors and circuitry for affecting the above-described operations will be readily appreciated by those skilled in the art in view of the foregoing and the discussion that follows.

FIGS. 2(a) and 2(b) are a cross-sectional view taken at line 2(a)—2(a) and a top planar view of the beam 12 of FIG. 1, respectively. In FIG. 2(a), one may observe that paired sets of electrodes 24, 24', 22, 22' and 26, 26' sandwich the beam 12. The electrodes comprise patterned arrangements of metallizations 30, 30', 32, 32' and 34, 34' deposited atop a patterned thin film layer of active pzt electroceramic material comprising underlying segments 36, 36', 38, 38' and 40, 40'. The segments of electroceramic material may be deposited upon the silicon beam 12 by a number of processes including, but not limited to, sol-gel deposition and planar magnetron sputtering. The various processes employed for depositing thin film layers of electroceramic pzt material, as well as those appropriate to the bulk and surface micromachining of silicon wafers for forming devices in accordance with the invention are described, for example, in D. L. Polla, "Integrated Ferroelectric Microelectromechanical Systems", *Science and Technology of Electroceramic Thin Films* (1995), pgs. 413 through 426, P. Schiller and D. L. Polla, "Integrated Piezoelectric Microactuators Based on PZT Thin Films", *Seventh International Conference on Solid-State Sensors and Actuators,* pgs. 154 through 157 and P. Muralt, A. Kholkin, M. Kholi, T. Maeder, K. G. Brooks, R. Luthier and N. Setter, "Fabrication and Characterization of PZT Thin Films For Micromotors", *Eighth International Conference on Solid-State Sensors and Actuators, and Eurosensors IX* (Jun. 25–29, 1995), pages 397 through 400 and such references are hereby incorporated by reference.

As noted, the electrodes 24 through 26' are fabricated at the top and bottom surfaces of the elongated beam 12. As such, their location facilitates the use of batch processing methods for forming large pluralities of angular velocity sensors. Silicon semiconductor processing techniques are essentially "vertical" in nature. That is, various silicon manufacturing processes including, for example, ion etching and photolithography, rely in large measure upon the patterning of horizontal planar surfaces for subsequent processing steps. In addition, bulk micromachining processing (e.g. inductively-coupled plasma reactive ion etching) of silicon-based devices further allows the formation of devices such as the present invention which feature structures having vertically squared-off shapes.

Referring to FIG. 2(b), a top planar view of the elongated beam 12, one may observe that the transverse members or ears 18, 18', 20 and 20' that suspend the elongated bar 12 flexibly within the frame 16 are aligned in pairs 18, 18' and 20, 20' a distance "d" from the opposed ends of the beam 12. In accordance with the invention, the distance d is such that the transverse pairs of ears suspend the elongated beam 12 at its nodal points. That is, for a beam 12 of known geometry and material composition, the pairs of aligned ears support the beam 12 at the null or nodal points of beam vibration. By so locating the points of support, maximum Q value is obtained. Further, by providing a monolithic device of silicon (a high-Q material) in which the beam 12 is supported by means of transverse silicon ears 18 through 20' formed integral therewith rather than by means of an organic adhesive, vibrational losses and consequent degradation of Q value is avoided.

As mentioned previously, electrical connections associated with the beam-mounted electrodes are omitted as unnecessary and understood by those skilled in the art for affecting the operations described below. The specific wiring of the device and arrangement of associated circuitry (both driving and sensing) will become apparent and may be varied in accordance with numerous factors including the polings of the opposed pzt segments 36 through 40' on the top and bottom surfaces of the elongated beam 12.

FIGS. 3(a) and 3(b) are side elevation and top planar views, respectively, of the sensor of FIG. 1 for illustrating the vibratory response of the elongated beam 12 to an applied driving signal and the Coriolis force-induced beam vibration experienced by a sensor in accordance with the invention. As seen in FIG. 3(a), the beam 12 is driven to vibrate at its natural frequency by signals applied to the electrodes 22 and 22' that affect simultaneous contractions and expansions of the segments of electroceramic pzt material 38 and 38' which alternate or oscillate over time. In the event that the segments 38 and 38' are poled in the same vertical direction, the application of the identical waveform to the overlying electrodemetallizations at the top and bottom of the beam 12 will produce the desired tandem of alternating compressions and expansions of the contacting pzt segments to produce bending of the beam 12 within a vertical plane. As noted, the transverse ears 18 and 20, located at the nodal points of the beam 12 are only minimally stressed by such bending.

Turning to FIG. 3(b), a top planar view of the sensor 10, one can see that the angular velocity-induced deflection of the beam 12 due to Coriolis forces occurs in the horizontal plane, transverse to the plane in which the beam 12 is driven. The bending, at the natural frequency of the beam 12 in the horizontal plane, simultaneously stresses the electrode 24 in tension and the electrode 26 in compression. The metallizations 30 and 34 that overlie such electroceramic sections are electrically connected through measuring circuitry (not shown) for measuring the changes in the internal dipole moments of electroceramic segments 36 and 40. A similar arrangement measures the stress-induced bending of the electroceramic segments of the pickoff electrodes 24' and 26' located at the bottom of beam 12. Redundant measurement of the angular velocity-induced Coriolis force exerted upon the elongated beam is thereby obtained.

FIG. 4 is a top planar view of a monolithic angular velocity sensor for sensing angular rotation about orthogonal axes 42 and 44. As shown, the two-axis angular velocity sensor is formed on a silicon substrate 46. Orthogonally-directed elongated beams 48 and 50 are suspended within apertures 52 and 54 respectively. Each of the elongated beams 48 and 50 includes an arrangement of electrodes of the type described with reference to the single-beam example disclosed above. A region 56, indicated by shadow outline, may be provided within the silicon substrate for on-chip integration of both driving and pickoff electronics.

FIG. 5 is a top planar view of a monolithic angular velocity sensor comprising orthogonal arrays of vibrating beam sensors for sensing rotation about orthogonal axes 58 and 60. Again, the device is of monolithic design, integral with a silicon substrate 62. An array of elongated beams, each supported at its nodal points by means of transverse ears and operating as the elongated beam 12 discussed above, driven at its natural frequency and deflected by Coriolis force-induced transverse bending to provide a signal indicative of angular velocity about an input axis, is formed within a first aperture 64 of the substrate 62. The array of beams within the aperture 64 is arranged for sensing angular rotation about the axis 58, while those of a second array formed within a second aperture 66 of the substrate 62 are aligned for sensing angular velocity about the axis 60.

By providing arrays of beams, readily formed by means of existing silicon fabrication technology, one may simultaneously generate and obtain pluralities of signals indicative of angular velocity about the axes 58 and 60. As such, by employing straightforward signal processing techniques well known to those skilled in the art, one may utilize such multiple outputs per axis to extract measurements of angular velocity of increased accuracy and reliability.

Thus it is seen that the present invention provides angular velocity sensors based upon MEMS technology that are readily suitable for batch fabrication. As such, they offer much lower production costs than existing devices, making such devices available for applications that have been economically unjustifiable in the past. By employing existing silicon device fabrication techniques, one may produce angular velocity sensors of substantially-reduced size and cost and high Q with greater sensitivity than the vibrating beam-type angular rotation sensors of the prior art. Further, as a silicon-based microelectromechanical system, the device is suitable for integration with on-chip electronics, offering the possibility of a self-contained system on a chip.

While this invention has been described with reference to its presently preferred embodiment, it is not limited thereto. Rather, the present invention is limited only insofar as it is defined by the following set of patent claims and includes within its scope all equivalents thereof.

What is claimed is:

1. An angular velocity sensor comprising, in combination:
   a) an elongated beam;
   b) a frame having an internal aperture for accommodating said beam, the top and bottom surfaces of said frame and said beam being substantially parallel;
   c) means for suspending said beam within said aperture, said means including (i) two pairs of aligned transverse members, (ii) each of said members being fixed at its opposed ends to an inner edge of said frame and to a major edge of said beam and (iii) each of said transverse members being fixed to a nodal point of said beam;
   d) a first layer of electroceramic material fixed to said beam for flexibly driving said beam;
   e) a second layer of electroceramic material fixed to said beam for detecting the presence and magnitude of Coriolis force exerted upon said beam;
   f) said layers of electroceramic material being fixed to the top and bottom surfaces of said beam;
   g) said beam, said means for suspending and said frame being an integral structure comprising silicon;
   h) a drive electrode and a pair of pickoff electrodes located at the top and bottom surface of said beam;
   i) each of said electrodes being separated from the surface of said beam by said layer of electroceramic material;
   j) each of said electrode and underlying layers of electroceramic material being substantially identically patterned;
   k) each of said drive electrodes is aligned along the major axis of said beam; and
   l) a pair of said pickoff electrodes is aligned and symmetrically located with respect to each of said drive electrodes.

2. A monolithic angular velocity sensor comprising, in combination:
   a) a plurality of mutually coupled sensor elements formed within a substantially-planar silicon substrate;
   b) each of said sensor elements including an elongated beam;
   c) the major axes of said sensor elements being aligned parallel to one another;

d) a frame having an internal aperture for accommodating said sensor elements;
e) means fixed to each of said beams for suspending said beams within said aperture whereby some of said beams are adjacent an inner edge of said aperture and others are solely adjacent other beams;
f) means fixed to each of said beams for flexibly driving said beams;
g) means fixed to each of said beams for detecting Coriolis force; and
h) said beams, said frame and said means for suspending comprising an integral structure.

3. A monolithic angular velocity sensor as defined in claim 2 wherein said means for suspending comprises:
a) two pairs of aligned transverse members;
b) one end of each of said aligned transverse members being fixed to a major side of a beam at a nodal point;
c) the opposed ends of transverse members of beams located adjacent an inner edge of said aperture being fixed thereto.

4. A monolithic angular velocity sensor as defined in claim 2 further characterized in that:
a) said means for flexibly driving comprises a layer of electroceramic material;
b) said means for detecting comprises a layer of electroceramic material;
c) the top and bottom surfaces of said frame and said beam being substantially parallel; and
d) said layers of electroceramic material being fixed to the top and bottom surface of said beam.

5. A monolithic angular velocity sensor as defined in claim 4 further including:
a) said means for driving additionally comprises a drive electrode and said means for detecting additionally comprises a pair of pickoff electrodes located at the top and bottom surfaces of said beam;
b) said electrodes being separated from the surface of said beam by said layers of electroceramic material; and
c) each of said electrodes and underlying layers of electroceramic material being of substantially identical dimensions.

6. A monolithic angular velocity sensor as defined in claim 5 further characterized in that:
a) each of said drive electrodes is aligned along the major axis of said beam; and
b) a pair of said pickoff electrodes is aligned and symmetrically located with respect to each of said drive electrodes.

7. A monolithic angular velocity sensor for sensing rotation rates about two orthogonal axes comprising, in combination:
a) a first sensor element;
b) a second sensor element;
c) said first and second sensor elements being formed within a silicon substrate;
d) each of said sensor elements including an elongated beam;
e) the major axes of said sensor elements being aligned orthogonal to one another;
f) a frame formed within said silicon substrate;
g) said frame having internal apertures for independently accommodating each of said elongated beams;
h) means for suspending each of said beams within an associated aperture, said means including (i) two pairs of aligned transverse members, (ii) each of said aligned transverse members being fixed at its opposed ends to an inner edge of said frame and to a major side of said beam and (iii) each of said transverse members being fixed to a nodal point of said beam;
i) a first layer of electroceramic material fixed to each of said beams for flexibly driving said beams;
j) a second layer of electroceramic material fixed to each of said beams for detecting the presence and magnitude of Coriolis force;
k) the top and bottom surfaces of said frame and said beams being substantially parallel to one another; and
l) said layers of electroceramic material being fixed to the top and bottom surfaces of said beams;
m) a drive electrode and a pair of pickoff electrodes located at the top and bottom surfaces of said beam;
n) each of said electrodes being separated from the surface of said beam by a layer of electroceramic material; and
o) each of said electrodes and underlying layers of electroceramic material being of substantially identical dimensions;
p) each of said drive electrodes being aligned along the major axis of said beam; and
q) a pair of said pickoff electrodes being aligned and symmetrically located with respect to each of said drive electrodes.

8. A monolithic angular velocity sensor for sensing rotation about two orthogonal axes comprising, in combination:
a) a first array of mutually-coupled sensor elements;
b) said first array including a first plurality of elongated beams aligned parallel to one another;
c) a second array of mutually-coupled sensor elements including a second plurality of elongated beams aligned parallel to one another;
d) the axes of the beams of the first array being aligned orthogonal to those of said second array;
e) each of said arrays being integral with a silicon substrate;
f) a frame having two internal apertures for accommodating said sensor elements;
g) means fixed to each of said beams for suspending said beams of said first array within one of said apertures and said beams of said second array within the other of said apertures whereby some of said beams are adjacent an inner edge of an aperture and others are solely adjacent other beams;
h) means fixed to each of said beams for flexibly driving said beams;
i) means fixed to each of said beams for detecting Coriolis force; and
j) said beams, said frame and said means for suspending comprising an integral structure.

9. A monolithic angular velocity sensor as defined in claim 8 wherein said means for suspending comprises:
a) two pairs of aligned transverse members;
b) one end of each of said aligned transverse members being fixed to a major side of a beam at a nodal point; and
c) the opposed ends of transverse members of beams located adjacent an inner edge of an aperture being fixed thereto.

10. A monolithic angular velocity sensor as defined in claim 8 further characterized in that:

a) said means for flexibly driving comprises a layer of electroceramic material;

b) said means for detecting comprises a layer of electroceramic material;

c) the top and bottom surfaces of said frame and said beam being substantially parallel; and d) said layers of electroceramic material being fixed to the top and bottom surfaces of said beams.

11. A monolithic angular velocity sensor as defined in claim 10 further including:

a) said means for driving additionally comprises a drive electrode and said means for detecting additionally comprises a pair of pickoff electrodes located at the top and bottom surfaces of said beams;

b) said electrodes being separated from the surfaces of said beams by said layers of electroceramic material; and c) each of said electrodes and underlying layers of electroceramic material being of substantially identical dimensions.

12. A monolithic angular velocity sensor as defined in claim 11 further characterized in that:

a) each of said drive electrodes is aligned along the major axis of said beam; and b) a pair of said pickoff electrodes is aligned and symmetrically located with respect to each of said drive electrodes.

* * * * *